United States Patent [19]

Hall

[11] 4,318,944

[45] Mar. 9, 1982

[54] REDUCING THE CRACKING OF AUTODEPOSITED COATINGS

[75] Inventor: Wilbur S. Hall, Plymouth Meeting, Pa.

[73] Assignee: Amchem Products, Inc., Ambler, Pa.

[21] Appl. No.: 891,203

[22] Filed: Mar. 29, 1978

Related U.S. Application Data

[63] Continuation-in-part of Ser. No. 608,968, Aug. 29, 1975, abandoned.

[51] Int. Cl.$^3$ .............................................. B05D 1/18
[52] U.S. Cl. .................................... 427/377; 427/309; 427/335; 427/435
[58] Field of Search ............... 427/435, 377, 335, 142, 427/309, 437; 204/181 R

[56] References Cited

U.S. PATENT DOCUMENTS

| | | | |
|---|---|---|---|
| 1,919,517 | 7/1933 | Konishi et al. | 427/435 |
| 3,011,914 | 12/1961 | Pflug | 427/435 |
| 3,339,526 | 9/1967 | Bradley et al. | 427/435 |
| 3,501,390 | 3/1970 | Turner | 204/181 E |
| 3,585,084 | 6/1971 | Steinbrecher | 427/435 |
| 3,640,810 | 2/1972 | Plasynski et al. | 204/181 R |
| 3,655,543 | 4/1972 | Dijkstra et al. | 204/181 R |

FOREIGN PATENT DOCUMENTS 48-4847 12/1973 Japan ............................. 204/181 R

OTHER PUBLICATIONS

Aronson, "Some Aspects of Film Formation . . . ", Journal of Oil and Colour Chemists' Assoc., 57, pp. 68–81 (1974).

*Primary Examiner*—Norman Morgenstern
*Assistant Examiner*—Richard Bueker
*Attorney, Agent, or Firm*—Alexis Barron

[57] ABSTRACT

In a process wherein an organic coating is formed on a metallic surface by immersing the surface in an acidic aqueous coating composition containing dispersed particles of an organic coating-forming material, wherein said composition forms on said surface an organic coating which increases in thickness the longer the surface is immersed in the composition and wherein the coating on said surface tends to crack, the improvement comprising maintaining a non-oxidizing atmosphere surrounding the metallic surface from the time it is removed from the coating composition until the coated metallic surface is heated to fuse the coating.

2 Claims, No Drawings

REDUCING THE CRACKING OF AUTODEPOSITED COATINGS

CROSS REFERENCE TO RELATED APPLICATION

This is a continuation-in-part of U.S. application Ser. No. 608,968, filed Aug. 29, 1975, now abandoned.

FIELD OF THE INVENTION

This invention relates to the formation of organic coatings on metallic surfaces. More specifically, this invention relates to the deposition on metallic surfaces of organic coatings by contacting the metallic surfaces with an acidic aqueous coating solution containing dispersed particles of an organic coating-forming material such as resin particles.

A relatively recent development in the coating field is the provision of water-based coating compositions which are effective, without the aid of electricity, in forming on metallic surfaces immersed therein organic coatings that increase in thickness or weight the longer the time the surfaces are immersed in the compositions. (For convenience, a coating formed from such a composition is hereafter referred to as "an organic coating which grows with time" or as an "autodeposited coating".) Speaking generally, compositions which are so effective comprise acidic aqueous coating solutions having dispersed therein particles of an organic material such as resin particles. Generally such coatings will also contain dispersed pigment particles which are deposited along with the resin particles. Autodeposited coatings are formed from such compositions as a result of their ability to attack and dissolve from the metallic surface metal ions in amounts which cause the particles to deposit on the surface in a manner such that there is a continuous buildup of organic coating on the surface. The coating that builds up on the metal surface has a solids concentration substantially greater than the solids concentration of the liquid coating composition which is distinctively different than coatings applied by conventional techniques such as dip or spray. Until dried such conventionally applied coatings have substantially the same solids concentration as the liquid coating composition. In this regard autodeposited coatings more closely resemble electrocoating though by contrast the solids concentration in the wet film formed by electocoating is on the order of 80 to 90% by weight whereas autodeposited coatings generally have wet film solids concentrations on the order of only 25 to 35% by weight. It is also significant to note that electrocoating generally utilizes soluble resins whereas autodepositing compositions are generally composed of solid resin particles dispersed in an acidic aqueous medium.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin and pigment solids dispersed in the aqueous medium.

Coatings formed from the aforementioned recently developed coating compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of the recently developed coating compositions which produce coatings which grow with time offer a number of advantages. For example, other factors held constant, they can be used to apply thicker organic coatings to the metallic surface in a shorter period of time and in a one-step operation. Also, the coating thickness can be controlled by varying the immersion time of the metallic surface in the coating composition. In general, coatings which have improved corrosion resistant properties and aesthetic appearance are obtainable. These are but a few of the advantages which flow from the use of said compositions.

A problem that has been encountered with the aforementioned type of coating where a coating bath has been operated continuously for some time, is that it has a tendency to crack prior to the time the organic coating is fused. For example, in a typical coating operation, the coated surface, after being contacted with the acidic aqueous coating composition, is dried and the resin is fused at an elevated temperature. It has been observed that the aforementioned type coating tends to crack when there is a lapse of time (for example, a few minutes) between the steps of removing the coated surface from the coating composition and subjecting the coated surface to elevated temperature to fuse the resin. Design of an industrial coating line may be such that the aforementioned lapse of time cannot be avoided.

The cracking of the coating can take the form of many fine cracks, referred to as "mudcracking", which appear initially at the upper edges of the coated metallic substrate and then in other areas of the coating. The cracks remain after the coating is fused.

For use in some applications, the cracked coating may be of little or no consequence. However, there are applications where such coatings would not be tolerable or at the least, desirable. Cracks in the coating generally lower the corrosion resistant properties of the coating. In applications where such properties are important, the cracked coatings would be unsuitable. They would be unsuitable also in application in which it is desired that the coating appearance comprises a smooth unbroken film.

The present invention relates to reducing or preventing the cracking of coatings formed from a coating composition of the type which forms on a metallic surface an organic coating which grows with time.

SUMMARY OF THE INVENTION

In accordance with this invention, the tendency of an autodeposited coating to crack is prevented or reduced by excluding oxygen from the coated metallic surface by maintaining an inert atmosphere around the coated metal surface until the coated metal is heated for fusing or by preventing the coated metal surface from substantial contact with atmospheric oxygen by maintaining the relative humidity of the surrounding atmosphere at about 65% or more after the coated metallic surface has been contacted with said composition. Preferably, the coated metallic surface is subjected to a relative humidity within the range of about 80 to about 100%.

DETAILED DESCRIPTION OF THE INVENTION

Coating compositions which are effective in forming organic coatings which grow with time are known. Examples of such coating compositions are described in U.S. Pat. Nos. 3,585,084, 3,592,699, 3,709,743 and 3,776,848, in British Patent No. 1,241,991, in South African Pat. No. 72/1146 and in Belgian Pat. of Addition No. 811,841.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

It is believed that the present invention will be used most widely in connection with coatings formed from compositions that contain solid particles of resin dispersed in the aqueous phase of the composition. A preferred composition for use in the practice of the present invention is described in U.S. patent application Ser. No. 562,898, filed Mar. 27, 1975, in the name of the applicant herein, and incorporated by reference. The preferred composition has a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, a pigment such as carbon black, and about 50 to about 100 g/l of resin particles which are all of substantially the same size and substantially chemically homogeneous, that is, each particle is comprised of the same monomeric constituents present in substantially the same proportions or resin particles which are prepared by copolymerizing the following monomers:

(1) about 25 to about 70, and preferably about 40 to about 65 wt. % of a conjugated diene having, for example, 4 to about 9 carbon atoms, such as butadiene or isoprene;

(2) about 5 to about 70, and preferably about 30 to about 65 wt. % of $CH_2=CHR$, wherein R is an aryl or a cyano group, for example, styrene or acrylonitrile;

(3) about 1 to about 50, and preferably about 3 to about 15 wt. % of a vinyl halide such as vinyl chloride or vinylidene chloride; and (4) about 0.5 to about 15, and preferably about 1 to about 4 wt. % of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, and preferably about 3 to about 5 carbon atoms, such as, for example: acrylic acid; cinnamic acid; methacrylic acid; crotonic acid; itaconic acid; maleic acid; and fumaric acid.

The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier content of the preferred latex is about 1 to about 4% based on the resin solids and comprises at least 90 wt. %, most preferably 100 wt. % of an anionic emulsifier such as a sulfonate, for example, sodium dodecylbenzene sulfonate, or a sulfosuccinate, for example, sodium oleoyl isopropanolamide sulfosuccinate, or a mixture thereof.

As mentioned above, the longer the metallic surface is immersed in the coating composition, the greater the buildup in coating thickness without the aid of external electricity. It is believed that for most applications, desired coating thickness can be obtained by immersing the metallic surface in the composition for a period of time within the range of about 30 seconds to about 3 minutes. However, it should be understood that longer or shorter periods of time can be used.

In industrial operations the coating process is generally carried out as a continuous operation in which the metal workpieces to be coated are carried through the various processing stages on a continuous moving conveyor; the treatment times being determined by the speed of the conveyor and the length of the treating zone. Generally the process will comprise five or more separate stages beginning with a cleaning stage which may be spray or dip followed by a water rinse after which the workpieces are immersed in the coating composition or bath which is designed to be of sufficient length to allow the workpieces to remain immersed in the bath for a period sufficient to develop the desired coating thickness. After the workpieces leave the coating bath they are generally subjected to another water rinse followed by treatment with a chemical composition referred to as a reaction rinse after which the workpieces enter a curing oven where the coating is fused by heating. As the workpieces traverse between these separate stages they are generally exposed to the ambient atmosphere for the time necessary to pass from one stage to the next which may be a minute or more depending upon the particular plant design. The improvement of this invention is directed to preventing defects in the coating which show up as a multiplicity of fine cracks referred to as mudcracking in the fused coating. Such cracking has been found to occur where the workpieces, after leaving the coating bath and before entering the curing oven, are exposed to an ambient atmosphere having a relative humidity of less than about 65%. The problem appears to be related to the condition of the coating bath and changes which occur as the bath is aged or worked. The problem generally arises after the bath has been in operation for some period of time and usually after sufficient metal surface has been coated to require replenishment of the bath components equivalent to one or more times the amounts initially used to make up the bath. In continuous operation where workpieces are being processed through the coating bath continually the volume of the bath is maintained substantially constant by continuously or periodically replenishing the bath with concentrated solutions containing the bath components in amounts sufficient to maintain the ingredients of the bath in about the same relative proportions as at make-up. In operation it has been observed that notwithstanding continuous or periodic replenishment to maintain the composition of the bath substantially constant the operating characteristics change as the bath is worked or aged. The occurrence of mudcracking in an aged or worked bath is believed to be due at least in part to oxidation of the resin brought on by exposure to oxygen in the air. The most severe exposure to oxygen in the air occurs when the resin has been deposited on the surface of a workpiece which is then removed from the bath into an atmosphere of low relative humidity so that the surface moisture rapidly evaporates exposing the unfused resin particles directly to the oxygen in the air. Since some degree of oxidation or oxidative polymerization is likely to have occurred in an aged or worked bath, coatings produced from such baths are more likely to crack on contact with air or oxygen than a coating produced in a newly made up bath. The use of an antioxidant in the coating composition is not desired since it may adversely affect the corrosion resistance of the coating and also adds to the complexity of replenishing.

According to this invention it has been found that the defects in coatings which are otherwise obtained from an aged or worked bath can be prevented by protecting the coating formed on the metal surface of a workpiece from direct contact with air or oxygen. Ordinarily the coated metal surface as it leaves the coating bath carries with it a supernatant liquid which is washed off in the subsequent water rinse. The supernatant liquid contains all of the bath ingredients and will at least initially continue to coat leaving an aqueous surface film on the coating which has a resin content generally lower than the coating composition and substantially lower than the resin content of the coating itself. So long as the outer surface of the coating is covered by a film of supernatant, or an aqueous film from a subsequent rinse, the film acts as a barrier to direct contact between the coating and oxygen in the air, oxygen having a very low solubility in water at atmospheric pressure. However, in an atmosphere of low relative humidity the aqueous surface film rapidly evaporates leaving the coating exposed directly to the air with consequent oxidative polymerization and mudcracking. In a preferred embodiment of this invention the coating is kept from direct contact with air by maintaining the aqueous surface film on the coating. The aqueous surface film is preserved by establishing and maintaining a slow or non-drying atmosphere in the immediate environment of the coated metal surface as the workpieces are conveyed from the coating stage to the curing stage. This is conveniently done by maintaining the relative humidity of the ambient atmosphere above 65% and preferably above about 80%. In general the required relative humidity is dependent upon the length of time the coating is exposed. At 100% relative humidity the exposure can be nearly indefinite since there is little or no tendency for the surface film to evaporate under such conditions; at about 80% relative humidity the coating can be exposed for up to about 30 minutes before significant loss of the aqueous surface film and at about 65% relative humidity the coating can be exposed for a minute or longer which is generally sufficient time for the coated workpieces to pass from one stage to the next in the usual industrial operation. Line stoppages can cause longer exposures and therefore a high relative humidity is preferred.

In the preferred method of this invention the coated surface is subjected to an environment having a relative humidity of about 65% or more after it is removed from the coating composition. It has been observed that if a period of time is allowed to elapse before subjecting the coated surface to such environment, the coating begins to crack. The time involved before cracking occurs tends to vary. As noted above, cracking of the coating has been observed to begin more rapidly and become more severe the more the coating composition is used continuously to coat metallic surfaces. In severe situations, the cracking can begin within 15 to 30 seconds after contact of the coated surface with the composition. In less severe situations, cracking may not begin until a lapse of time of about one minute or more.

It is noted that autodeposited coatings are generally heated to dry and fuse the coating. Fusion of the coating renders it continuous, thereby improving its resistance to corrosion and adherence to the underlying metallic surface. The conditions under which the drying and/or fusion operation is carried out depend somewhat upon the type of organic material employed. In general, heat will be required to fuse these resinous coatings. The corrosion resistant properties of these resinous coatings fused at elevated temperature have been observed to be better than coatings which have been air dried. However, there are applications where air dried coatings can be used satisfactorily. The fusion of the coating should be carried out below temperatures which cause the coating to degrade. Exemplary conditions used in fusing coatings produced according to the present invention are temperatures within the range of about 100 to about 200° C. for periods of time within the range of about 10 to about 30 minutes, depending on the mass of the coated part. Baking the coating for a period of time until the metallic surface has reached the temperature of the heated environment has been used effectively. As mentioned above, a coating which has cracked remains cracked even after heating.

In applications where design requirements of the coating line necessitate that there be a lapse of time from after contact of the coated surface with the coating composition until the coated surface is subjected to heating, during which lapse of time the coating cracks, the coated surface should be treated in accordance with the present invention.

The present invention can be used in combination with other treatment steps that may be used between termination of the contact of the coated surface with the coating composition and the heating of the coated surface. Exemplary treatment steps are discussed below.

Water rinsing the coated surface after it has been withdrawn from the composition, and before significant drying takes place is effective in removing therefrom residuals such as acid and other ingredients of the composition that adhere to the coated surface. If such residuals are allowed to remain on the coated surface, they may change or adversely affect the quality of the final fixed coating. For a specific application, a determination can be made as to whether the residuals cause adverse effects which are not tolerable. If they do, they should be removed, for example, by water rinsing with tap or deionized water. In an industrial coating line, more than a minute and as many as 2 to 4 minutes may elapse before the wet coated surface is contacted with the water rinse. During this period of time, the wet coated surface should be kept from oxidizing by maintaining a non oxidizing environment in the area between successive treatment stages of the coating line following the coating stage. This can be achieved for example by use of an inert gas such as carbon dioxide or nitrogen. Other inert gases or mixtures of gases can be used. It has been found that when using an inert gas cracking is prevented even when the wet coating is completely dried to touch during the time it is protected by an atmosphere of inert gas. It is apparent therefore, that the cause of cracking is exposure to oxygen rather than the drying process and the use of moisture laden air rather than inert gas provides substantially the same protection from excessive exposure to oxygen or an oxidizing environment. Under the usual operating conditions with ambient temperatures between 60° F. and about 80° F. at atmospheric pressure cracking can be eliminated or substantially prevented by maintaining a relative humidity of about 65% or higher in the immediate area of the coated metal surfaces traversing between the coating composition and subsequent treatment stages. The present process can be used in any situation where cracking occurs even when the lapse of time is not as great at 1 or 2 minutes or more.

It is known also to modify the properties of a wet autodeposited resinous coating by subjecting it to certain types of liquid compositions. For example, the corrosion resistant properties of a resinous coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. By way of example, such an aqueous rinse composition can comprise a total chromium concentration within the range of about 0.15 g/l (expressed as $CrO_3$) to about 2 g/l, wherein from about 40–95% of the chromium is in its hexavalent state and the remainder of the chromium is in its reduced state.

With regard to other types of liquid compositions that may be used to modify the properties of the uncured or unfused coating, it has been reported that the water and salt spray resistance of a fused resinous coating can be improved by contacting the unfused coating with a solution, preferably an aqueous solution, of phosphoric acid (see U.S. Pat. No. 3,647,567). The recommended amount of phosphoric acid in the solution is about 0.25 to about 7 wt. % based on the total eight of the solution.

The use of one or more of any such liquid compositions used to modify the properties of the uncured or unfused coatings is contemplated as within the scope of the process of this invention and is referred to generally as a reaction rinse.

In a coating operation in which the coated surface is subjected to a water rinse, as described above, and thereafter to a reaction rinse which modifies the properties of the coating enough time may elapse for the coating, even though still wet from the water rinse, to begin cracking before it is contacted with the reaction rinse. Accordingly, the coated surface should be protected against contact with oxygen suitably by subjecting the coated surface to an environment having a relative humidity of about 65% or more between these steps in order to reduce or prevent the cracking. By way of example, it may take about 1 to 2 minutes to transfer the coated surface from the water rinse stage to the reaction rinse stage, during which time the coated surface can be treated in accordance with this invention.

Similarly, in an application in which the water rinse step is not used and the next step in the coating process following immersion in the coating composition is to treat the coated surface directly with the reaction rinse, the coated surface can be treated according to the present invention while being transferred from the coating composition to the reaction rinse if the coating otherwise tends to crack.

And in similar fashion, the coated surface should be treated in accordance with the present invention when being transferred from the reaction rinse to the stage where it is heated to fuse the resin in the event that the time of transfer is such that the coating would otherwise tend to crack. By way of example, it may take about 1 to 2 minutes to transfer the coated surface from reaction rinse to the heating means, during which time the coated surface can be treated in accordance with this invention.

As noted, the temperature to which the coated surfaces are subjected when treated in accordance with the present invention can be the ambient temperature existing in an industrial coating plant, though the process can be used at higher or lower temperatures. Thus, the temperature in general will be within the range of 60° to 80° F. but may be higher in hot months of the year.

The desired relative humidity can be provided according to any suitable method of artificial humidification and may be aided by evaporation from the various treatments in the coating line. For example, water can be atomized into the air or steam can be injected into the air surrounding the coated surfaces. The coated surfaces can be transferred from one stage to the next in tunnels or confined spaced where the desired exclusion of oxygen can be achieved by use of an inert gas or by simply maintaining the desired relative humidity.

The mode of operation or means by which maintaining the relative humidity within the desired range reduces or prevents the tendency of the coating to crack is believed to be the exclusion of oxygen as previously noted though other factors may be involved. As mentioned above, it has been observed that within a relatively short period of time after the coated surface is contacted with the coating composition, cracks initially appear at the upper edges of the coated surface. It is at the upper or top edges or surfaces of the coated part from which water on the surface drains to lower parts of the surface. As this is occurring, evaporation can also occur leaving the resin particles of the coating exposed to the air.

It is believed that as evaporation of the aqueous surface film takes place the direct contact between oxygen in the air and the resin particles in the uncured and unfused coating results in oxidative drying of the resin which is why mudcracking appears in coatings formed from an aged or worked bath. In such baths the resin particles present may be already partially oxidized and therefore the coatings formed from aged or worked baths may contain partially oxidized resin or may be partly composed of oxidized resin so that the further oxidation on exposure of the coating to oxygen quickly reaches the level of oxidation at which mudcracking occurs. The cracks which form in the coating before fusing to coalesce the resin particles remain after the coating is fused.

Generally once the operating temperatures are above the glass transition temperature of the resin (Tg) there is little or no tendency to crack; however, in the present case where the Tg of the preferred resin is below about 50° F. cracking occurs notwithstanding the entire process is carried out above 50° F. and even though the pigment loading in the coating composition is very low. The pigment volume concentration in the autodeposited coating employing carbon black pigment is generally less than about 1% and is expected to be less than about 20% for any pigment. The preferred composition has about 1.5 grams of pigment for each 100 grams of resin. In view of the low pigment volume concentration it is believed that the occurrence of mudcracking as noted above is not affected by pigment volume concentration.

It is believed that maintaining the coated surfaces in an environment of relatively high humidity inhibits the oxidative drying thereby reducing or preventing the tendency of the coating to crack. While the use of an inert gas or high relative humidity to maintain an oxygen free or nonoxidizing environment are preferred methods it is understood that the invention contemplates any method by which oxygen absorption or uptake by the unfused coating is inhibited or prevented. The most practical method for industrial application at present is to maintain a high relative humidity. It may be also that water which is maintained on the surface of the coating and between the particles of the coating-forming material aids in plasticizing the material and may facilitate particle re-orientation. In subjecting an autodeposited coating to heat the resin particles are fused into a continuous coating which differs from a fused coating of the same resin conventionally applied. The autodeposited coating is significantly less thermoplastic and less soluble in organic solvents. Although water evaporates from the coating during the heating thereof, there is little or no tendency of the coating to crack when the coating is heated. The temperature at which the particles soften and coalesce will depend on the particular material comprising the particles. Surprisingly it has also been found that in the process of this invention no cracking occurs when water is evaporated from the coating in the absence of oxygen. Thus, in an oxygen free environment, the present coatings can be dried without any tendency to mudcracking even though the same coating dried in air has extensive mudcracking. By evaporating the water from the wet coating in an inert dry gas the coating which would otherwise be mudcracked is free of cracks.

In applications where the coatings are baked, it is preferred that the baking be conducted in 2 stages. In the first stage, the temperature used is somewhat above the boiling point of water and the coating is baked for a period of time such that substantially all of the water is evaporated. Thereafter the coating is baked in a second stage at a higher temperature and for a period of time sufficient to fuse the coating.

The extent to which coatings tend to crack and the severity of cracking depends on various factors. For example, cracking which is only encountered in an aged or worked bath tends to occur more rapidly and be more severe the more the coating composition is used continuously to coat metallic parts. Also, it has been observed that the thicker the coating, the greater the tendency of the coating to crack. For any particular application it is recommended that experience be used in determining the most effective percent relative humidity to use. However, a recommended preferred range of relative humidity is about 80 to about 100%.

EXAMPLES

Unless stated otherwise, the steel panels used in the work described below are unpolished Q-panels, 3"×4", and "%" means percent by weight based on the total weight of the stated composition.

Comparative Example

The following acidic aqueous coating composition is prepared by combining

| Ingredients | Amounts |
| --- | --- |
| latex containing about 54% solids | 185 g |
| ferric fluoride | 3 g |
| hydrofluoric acid | 2.3 g |
| black pigment dispersion | 5 g |
| water | to make 1 liter |

The resin of the latex in the above composition comprises about 62% styrene, about 30% butadiene, about 5% vinylidene chloride and about 3% methacrylic acid. A film formed from the resin is soluble in refluxing chlorobenzene to the extent of about 13%. That the resin is cross-linked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last 2 mentioned ingredients being emulsifiers. The pH of the latex is about 7.8 and the surface tension thereof about 45–50 dynes/cm. The average particle size of the resin is about 2,000 A.

The black pigment dispersion in the above composition is an aqueous dispersion having a total solids content of about 36%. Carbon black comprises about 30% of the dispersion. It has a pH of about 10–11.5 and a specific gravity of about 1.17. The dispersion contains a nonionic dispersing agent for the solids, and is sold under the trademark Aquablak 115.

A steel panel is immersed in the composition for 90 seconds after the composition has been used to coat several square feet of panels. After withdrawal from the composition, the wet coated panel is allowed to dry partially for about 3 minutes in air having a temperature of about 83° F. and a relative humidity of about 59%. Thereafter it is rinsed by immersing in water for about 30 seconds. After withdrawal from the water rinse, the wet coated panel is allowed to dry in air (temperature and humidity as stated above) for about two minutes. It is then immersed for 30 seconds in a solution of about 9 g/l of $Na_2Cr_2O_7.2H_2O$. After withdrawal from the Cr composition, the wet coated panel is allowed to dry in air (temperature and humidity as stated above) for about 1½ minutes. Thereafter, the coated panel is baked for 10 minutes in an oven at 170° C. The thickness of the coating on the panel is about 1 mil.

Examination of the fused coating shows that it has mudcracks along the top edges. Cracking is noticed initially within 1 to 2 minutes after the coated panel is withdrawn from the coating composition. The cracked fused coating has a poor appearance and experience has shown that the cracks adversely affect the corrosion resistance of the coated panel.

EXAMPLE NO. 1

Another steel panel is coated exactly as described above, except that between each of the various treatment stages water is misted into the atmosphere surrounding the wet coated panel to impart thereto a relative humidity of about 87 to about 89%. The wet coating does not crack and the fused coating contains no cracks.

The above example illustrates the effectiveness of the present invention. The present invention can be used in the coating of ferriferous surfaces other than steel, exemplified above, and also metallic surfaces such as, for example, aluminum and zinc.

EXAMPLE NO. 2

Using a coating bath prepared as in the comparative example above containing 5.0 gms. pigment dispersion, 180.0 gms. resin dispersion, 50.0 mls. of Ferric fluoride (hydrofluoric acid/ferric fluoride solution containing about 60 g/l $FeF_3$ and about 46 g/l HF) and deionized water sufficient to make 1.0 liter. Ten panels were coated for three minutes immersion time and allowed to dry in air at 72° F. and 30% relative humidity. The dried coating measured 1.6–1.7 mils thick and showed no signs of mudcracking. Ten panels were coated for 90 secs. immersion time and allowed to dry in air at 72° F. and 30% relative humidity. The dried coatings showed no signs of mudcracking even after they had dried to the touch.

A bath of the same composition after having been used for considerable in-plant processing (more than one turnover) was used in the following experiments:

Panels processed in this bath for 90 seconds were allowed to air dry at 73° F. and 30% R.H. In 1 min. and 40 seconds, incipient mudcracking was observed. In 5 minutes, mudcracking was extensive. This behavior is characteristic of aged or worked baths.

Using the same worked bath as above, 10 panels were processed for 90 secs. and immediately placed in an atmosphere of carbon dioxide. After one hour, the coatings were completely dry to the touch and showed no signs whatever of mudcracking.

The same worked bath was used to process ten panels for 90 seconds immersion time and immediately placed in an atmosphere of nitrogen gas. After one hour the coatings were completely dry to the touch and showed no signs of mudcracking. Both the $CO_2$, and the nitrogen atmospheres used were dry gases held at about 72° F. These examples illustrate that mudcracking of the autodeposited coating occurs only in the presence of oxygen. When oxygen is absent, the relative humidity can be very low or even zero.

EXAMPLE NO. 3

In an industrial coating line in which each zone between the coating stage and the rinse stage and between the rinse stage and the reaction rinse are approximately 336 cubic feet in volume, mudcracking in the coating is effectively prevented by installing 8 misting nozzles per zone capable of misting 12 gallons per hour of deionized water at room temperature using a nozzle pressure of 40 pounds per square inch. Suitable misting nozzles are those supplied by Spraying Systems Company designated ¼ ML 1.5 SS. The misting nozzles are used only intermittently as necessary to maintain the humidity above about 80% relative humidity.

I claim:

1. In an autodepositing coating process wherein an organic coating is formed on a metallic surface in a bath containing an acidic aqueous coating composition containing dispersed solid resin particles such that without external electricity the thickness of the coating formed increases during the time the metallic surface is immersed in the composition wherein the volume of the coating composition in the bath is maintained by periodic or continuous replenishing of the bath components as metal is processed through the bath and wherein cracks are formed in the coating produced on said metallic surface immersed in a replenished bath, the improvement which comprises maintaining an environment substantially free of oxygen in the area of the metal surface having a wet coating thereon during at least a part of the time after said coated metal surface is withdrawn from the coating composition and before the coating is fused to prevent the formation of cracks in the wet coating, wherein the substantially oxygen free environment is maintained by surrounding the metallic surface with an inert gas.

2. An autodepositing coating process according to claim 1 wherein the inert gas is nitrogen or carbon dioxide.

* * * * *